(12) United States Patent
Mitsuhashi

(10) Patent No.: US 7,717,489 B2
(45) Date of Patent: May 18, 2010

(54) VEHICULAR SEATS

(75) Inventor: Atsutaka Mitsuhashi, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/357,787

(22) Filed: Jan. 22, 2009

(65) Prior Publication Data
US 2009/0218844 A1 Sep. 3, 2009

(30) Foreign Application Priority Data
Mar. 3, 2008 (JP) ............................ 2008-052001

(51) Int. Cl.
*B60N 2/10* (2006.01)
*B60N 2/30* (2006.01)
(52) U.S. Cl. ............... 296/65.09; 296/65.03; 297/15
(58) Field of Classification Search ............ 296/65.05, 296/65.09, 65.16, 65.01, 65.03, 65.08, 65.17; 297/378.1, 378.12, 15
See application file for complete search history.

(56) References Cited

U.S. PATENT DOCUMENTS

| | | | | |
|---|---|---|---|---|
| 6,698,837 B2 * | 3/2004 | Pejathaya et al. | ...... | 297/378.12 |
| 6,986,542 B2 * | 1/2006 | Imajo et al. | ............... | 296/65.09 |
| 7,108,306 B2 * | 9/2006 | Suda et al. | ............... | 296/65.08 |
| 7,306,278 B2 * | 12/2007 | Holdampf | ................ | 296/65.09 |
| 7,347,243 B2 * | 3/2008 | Waki | .......................... | 152/543 |
| 7,537,260 B2 * | 5/2009 | Epaud | .................... | 296/65.09 |

FOREIGN PATENT DOCUMENTS
JP 2002-067761 A 3/2002

OTHER PUBLICATIONS
English language Abstract of JP 2002-067761 A.

* cited by examiner

*Primary Examiner*—Glenn Dayoan
*Assistant Examiner*—Gregory Blankenship
(74) *Attorney, Agent, or Firm*—Greenblum & Bernstein, P.L.C.

(57) ABSTRACT

One aspect of the present invention can include a vehicular seat having a first member, a cooperatively moving apparatus configured to release a lock apparatus from being locked in cooperation with a movement of the first member, and a second member configured to be adjusted when the lock apparatus is released. Further, the cooperatively moving apparatus includes a main cooperatively moving member connected to the first member and capable of cooperative movement with the first member, and a sub cooperatively moving member connected to the lock apparatus and capable of being moved by receiving a force from the main cooperatively moving member. Also, a hold mechanism is provided between the main cooperatively moving member and the sub cooperatively moving member, the hold mechanism is capable of holding the lock apparatus in a lock release state by holding a portion of the sub cooperatively moving member by a predetermined amount while operating the main cooperatively moving member. And, when the lock apparatus is maintained in the lock release state, the second member is set to one of a plurality of set states, the lock apparatus is able to be brought into a lock state before and after operating the hold mechanism.

3 Claims, 5 Drawing Sheets

VEHICULAR SEATS

This application claims priority to Japanese patent application serial number 2008-052001, the contents of which are incorporated herein by reference.

BACKGROUND OF THE INVENTION

1. Field of the Invention

The present invention relates to a vehicular seat mounted in a car or the like.

2. Description of the Related Art

In a background art, a known vehicular seat includes a seat cushion, a seat back connected to the seat cushion to be able to adjust an angle, a lock apparatus for locking the seat cushion by a vehicle floor face, and a cooperatively moving apparatus (refer to Japanese Laid-Open Patent Publication 2002-67761). The cooperatively moving apparatus may release the lock apparatus from being locked in cooperation with a movement of the seat back onto the seat cushion. The lock apparatus includes an interlock of maintaining a lock release state by being operated once by the cooperatively moving apparatus. The interlock is released by utilizing a force of pressing the lock apparatus to an anchor, and the interlock may change the lock apparatus into a lock state.

However, in recent years, a seat which can be changed to various modes or positions has been developed. Such a seat includes a member inclined by releasing a lock apparatus from being locked. And it is possible to intend to lock the lock apparatus after setting the member to one of a plurality of set states in a lock release state. However, when the lock apparatus is released from being locked directly by a cooperatively moving apparatus of the background art, the lock apparatus is switched to a lock state, the lock release state, the lock state momentarily. Therefore, it is difficult to set the member to a desired set state.

On the other hand, when the lock apparatus is maintained in the lock release state by using the interlock of the background art, an operation for releasing the interlock is needed. Therefore, this makes such a configuration more difficult to use. Hence, in a seat including a member capable of being set to a plurality of set states by releasing a lock apparatus, there is a need for a vehicular seat capable of easily changing a mode or the like of a seat.

SUMMARY OF THE INVENTION

One aspect of the present invention can include a vehicular seat having a first member, a cooperatively moving apparatus configured to release a lock apparatus from being locked in cooperation with a movement of the first member, and a second member configured to be adjusted when the lock apparatus is released. Further, the cooperatively moving apparatus includes a main cooperatively moving member connected to the first member and capable of cooperative movement with the first member, and a sub cooperatively moving member connected to the lock apparatus and capable of being moved by receiving a force from the main cooperatively moving member. Also, a hold mechanism is provided between the main cooperatively moving member and the sub cooperatively moving member, the hold mechanism is capable of holding the lock apparatus in a lock release state by holding a portion of the sub cooperatively moving member by a predetermined amount while operating the main cooperatively moving member. And, when the lock apparatus is maintained in the lock release state, the second member is set to one of a plurality of set states, the lock apparatus is able to be brought into a lock state before and after operating the hold mechanism.

Therefore, the first member is moved, the lock apparatus is released from being locked by the cooperatively moving apparatus, the lock release state is maintained by the hold mechanism during the predetermined time period, and the second member can be adjusted to one of the plurality of set states during the time period. Further, thereafter, the lock apparatus is brought to the lock state, and the second member is locked to the desired set state. Therefore, the second member can easily be adjusted to the desired set state.

DETAILED DESCRIPTION OF THE INVENTION

Each of the additional features and teachings disclosed above and below may be utilized separately or in conjunction with other features and teachings to provide improved vehicular seats. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
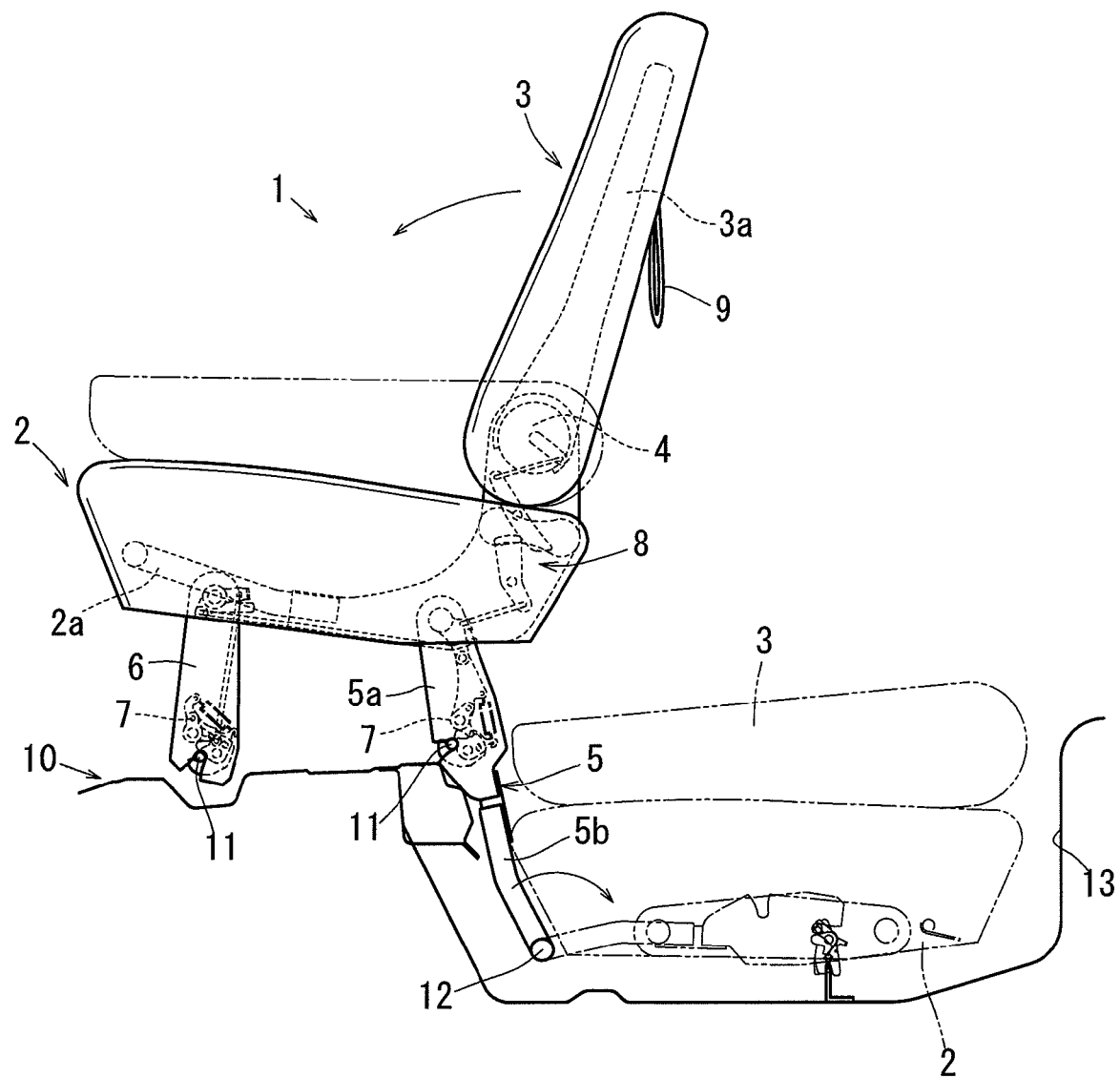
FIG. 1 is a side view of a vehicular seat of the present invention.

As shown in FIG. 1, a seat 1 is a seat mounted on a carriage of a car or the like and includes a seat cushion 2 and a seat back (second member) 3. The seat cushion 2 and the seat back 3 include frames 2a and 3a in a shape of a rectangular frame, and the frames 2a and 3a are connected to a reclining apparatus (lock apparatus) 4 to allow angular adjustment.

Figure 2:
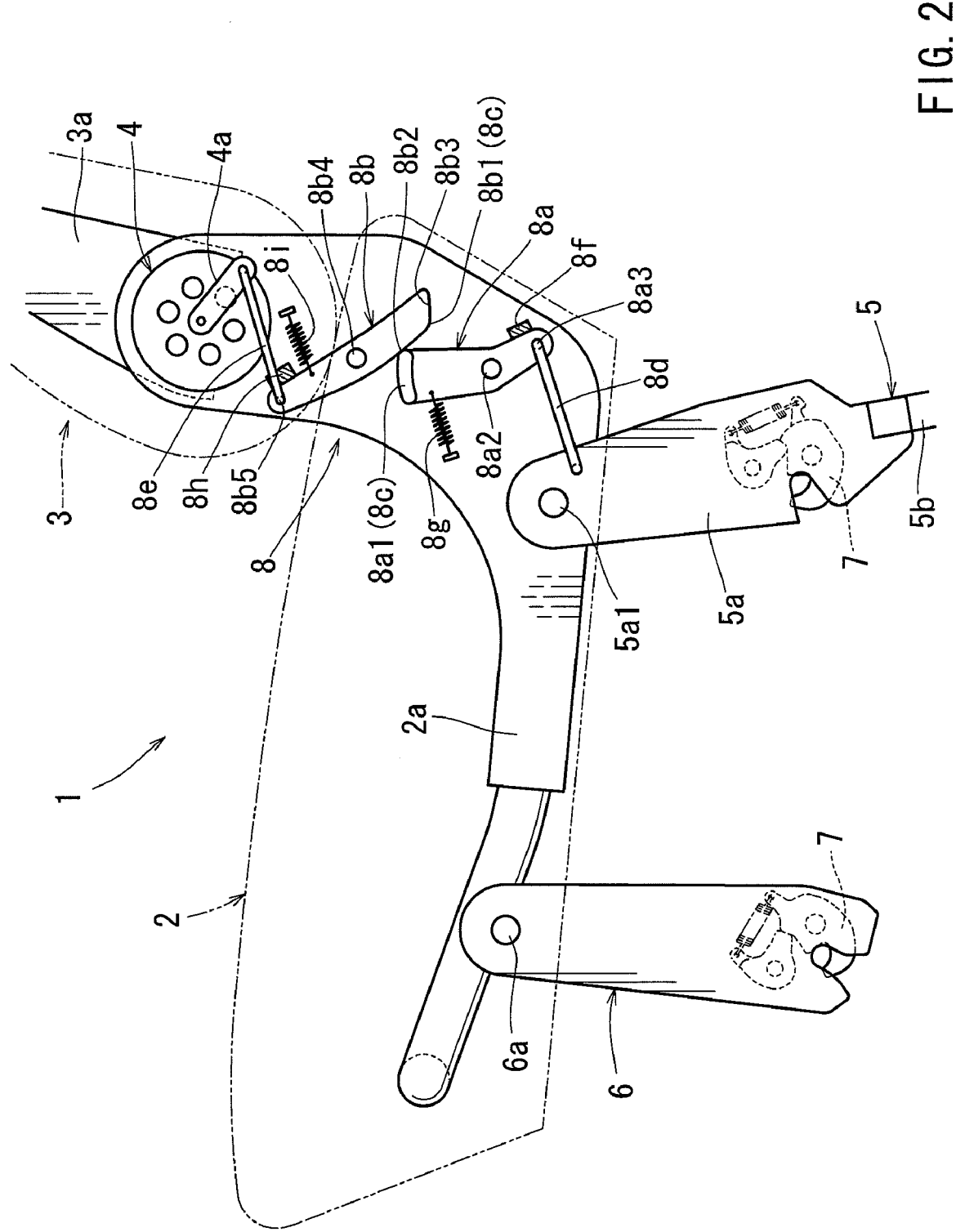
FIG. 2 is a side view of a part of the vehicular seat in a use mode.

As shown in FIGS. 1 and 2, a front side portion of the seat cushion 2 is provided with a pair of legs 6 and a rear side portion thereof is provided with a pair of connecting members (first members) 5. The leg 6 includes a connecting portion 6a connected to the frame 2a at one end portion thereof, and other end portion thereof includes a lock mechanism 7 locked by an anchor 11 of a vehicle floor 10.

As shown in FIGS. 1 and 2, the connecting member (first member) 5 includes a leg portion 5a on an upper side and includes an extended portion 5b on a lower side. The leg portion 5a includes a connecting portion 5a1 connected to the frame 2a at one end portion thereof and other the end portion thereof includes the lock mechanism 7 locked by an anchor 11 of a vehicle floor 10. The extended portion 5b is attached to an attach portion 12 provided to a bottom face of a storage recess portion 13 formed at the vehicle floor 10.

As shown in FIG. 2, a cooperatively moving apparatus 8 is provided between the connecting member (first member) 5 and the reclining apparatus (lock apparatus) 4. The cooperatively moving apparatus 8 may release the reclining apparatus 4 from being locked in cooperation with a movement of the connecting member 5. The cooperatively moving apparatus 8 includes a main cooperatively moving member 8a and a sub cooperatively moving member 8b. The main cooperatively moving member 8a includes an attaching portion (inclination center) 8a2 attached to the frame 2a substantially at a center thereof. One end portion of the main cooperatively moving member 8a is provided with a connecting portion 8a3 connected to the leg portion 5a via a cable 8d.

Figure 3:
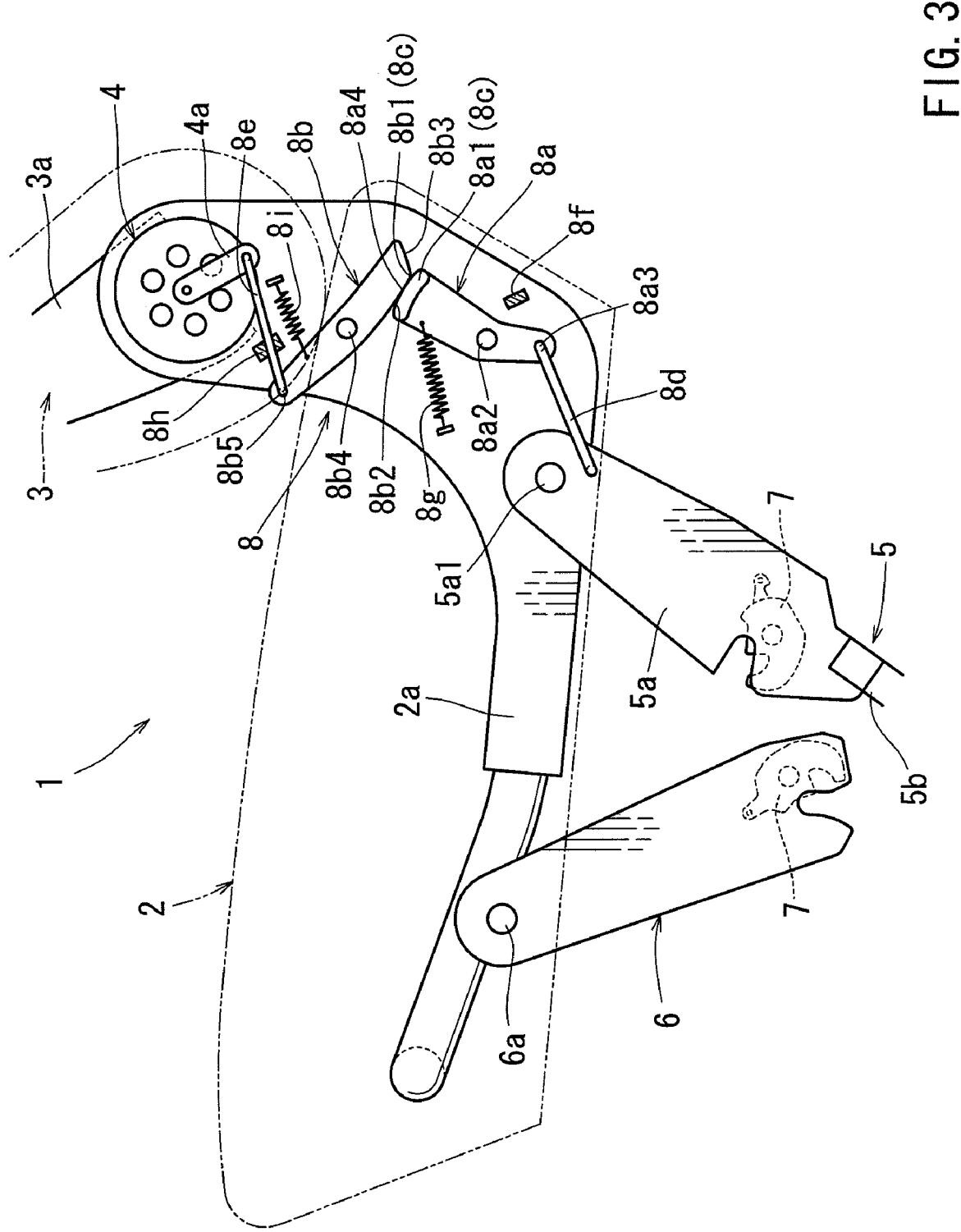
FIG. 3 is a side view of a part of the vehicular seat on the way from the use mode to a storage mode.
Figure 5:
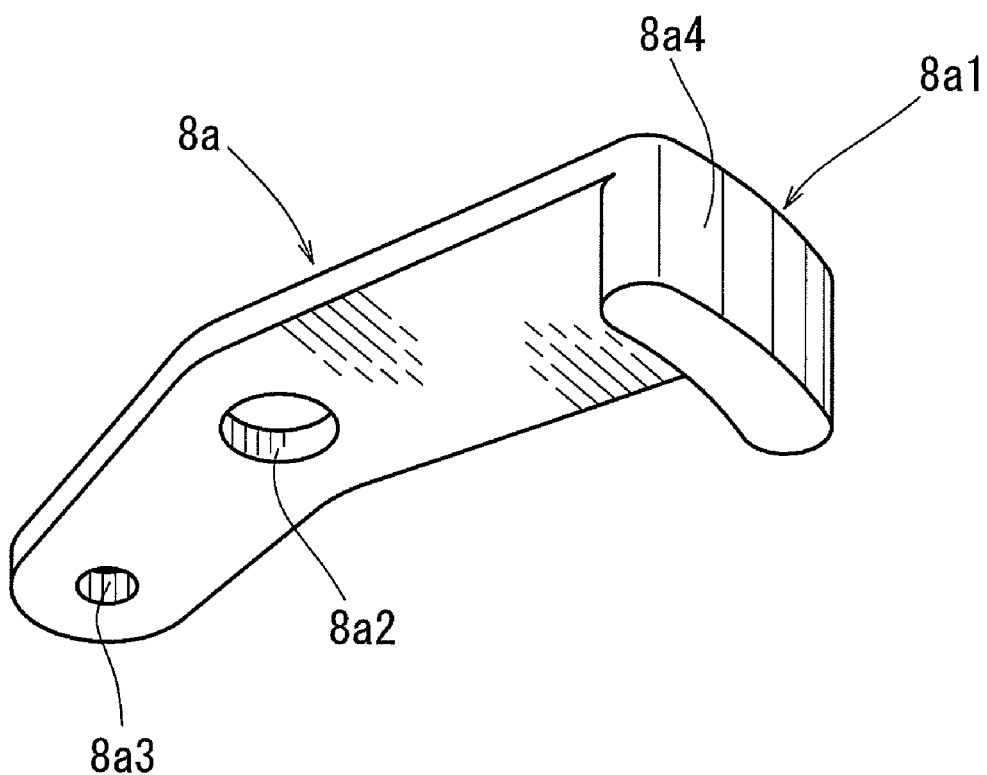
FIG. 5 is a perspective view of a main cooperatively moving member.

As shown in FIGS. 3 and 5, other end portion of the main cooperatively moving member 8a is formed with a circular arc portion 8a1. The circular arc portion 8a1 is a constituent member of a hold mechanism 8c for holding a portion of operating a lever 4a of the reclining apparatus 4 in a constant position. The circular arc portion 8a1 is positioned along an end edge of the main cooperatively moving member 8a and includes a circular arc face 8a4 at an outer peripheral portion thereof. The circular arc face 8a4 is formed substantially in a circular arc shape centering on an attaching portion (inclination center) 8a2 of the main cooperatively moving member 8a.

As shown in FIG. 2, the sub cooperatively moving member 8b includes an attaching portion (inclination center) 8b4 inclinably attached to the frame 2a substantially at a center thereof. One end portion of the sub cooperatively moving member 8b includes a connecting portion 8b5 connected to the lever 4a of the reclining apparatus 4 via a cable 8e. Other end portion of the sub cooperatively moving member 8b is formed with a contact portion 8b1 and a first force receiving portion 8b2 and a second force receiving portion 8b3. The contact portion 8b1 is a constituent member of the hold mechanism 8c, provided at an end edge of the sub cooperatively moving member 8b, and provided with an angular shape. The first force receiving portion 8b2 and the second force receiving portion 8b3 are formed at the end edge of the sub cooperatively moving member 8b substantially linearly from the contact portion 8b 1.

As shown in FIG. 2, the frame 2a is provided with a stopper 8f for positioning the main cooperatively moving member 8a and a stopper 8h for positioning the sub cooperatively moving member 8b. An urge member 8g for urging the main cooperatively moving member 8a to the stopper 8f is provided between the main cooperatively moving member 8a and the frame 2a. An urge member 8i for urging the sub cooperatively moving member 8b to the stopper 8h is provided between the sub cooperatively moving member 8b and the frame 2a.

As shown in FIG. 1, the leg 6 and the connecting member 5 are erected and the respective lock mechanisms 7 are locked by the respective anchors 11 in a use mode. The seat back 3 can be moved an angle so as to be inclined a little to a rear side relative to the seat cushion 2 and locked by the reclining apparatus 4 in one of a plurality of set angles. An operating band 9 is extracted substantially from a center of the back face of the seat back 3 to a rear side. When the seat 1 is moved from the use mode to a storage mode, the operating band 9 is pulled. The lock band 9 is connected to the lock mechanism 7 via a cable or the like, not illustrated, and the lock mechanism 7 is released from being locked by pulling the operating band 9.

When the operating band 9 is pulled further, as shown in FIGS. 1 and 2, the connecting member 5 is positioned toward a rear side centering on the attaching portion 12. And the seat cushion 2 is moved from a position of use to the storage recess portion 13 (storage position). When the connecting member 5 is moved to the rear side, the connecting member 5 pulls the cable 8d, and the main cooperatively moving member 8a is inclined in the clockwise direction against the urge member 8g. Further, the circular arc portion 8a1 of the main cooperatively moving member 8a abuts the first force receiving portion 8b2, and the sub cooperatively moving member 8b is moved in the counterclockwise direction against the urge member 8i. As a result, the sub cooperatively moving member 8b pulls the cable 8e and the reclining apparatus 4 is released from a lock state.

As shown in FIG. 3, when the circular arc portion 8a1 reaches the contact portion 8b1, the contact portion 8b1 slides on the circular arc face 8a4 of the circular arc portion 8a1. The circular arc face 8a4 is formed substantially in the shape of the circular arc centering on the rotation center of the main cooperatively moving member 8a, and therefore, even when the contact portion 8b 1 contacts with any portion of the circular arc face 8a4, the angles of the sub cooperatively moving member 8b keeps substantially the same. Therefore, during a time period in which the contact portion 8b1 slides on the circular arc portion 8a1 (time period in which the hold mechanism 8c is operated), the operating the lever 4a is held to a predetermined amount. In this way, the reclining apparatus 4 can be held in the lock release state. Further, lever 4a is pulled pertinently, that is, is not pulled excessively, and therefore, the reclining apparatus 4 or the like can be prevented from being destructed by excessively pulling the lever 4a.

Figure 4:
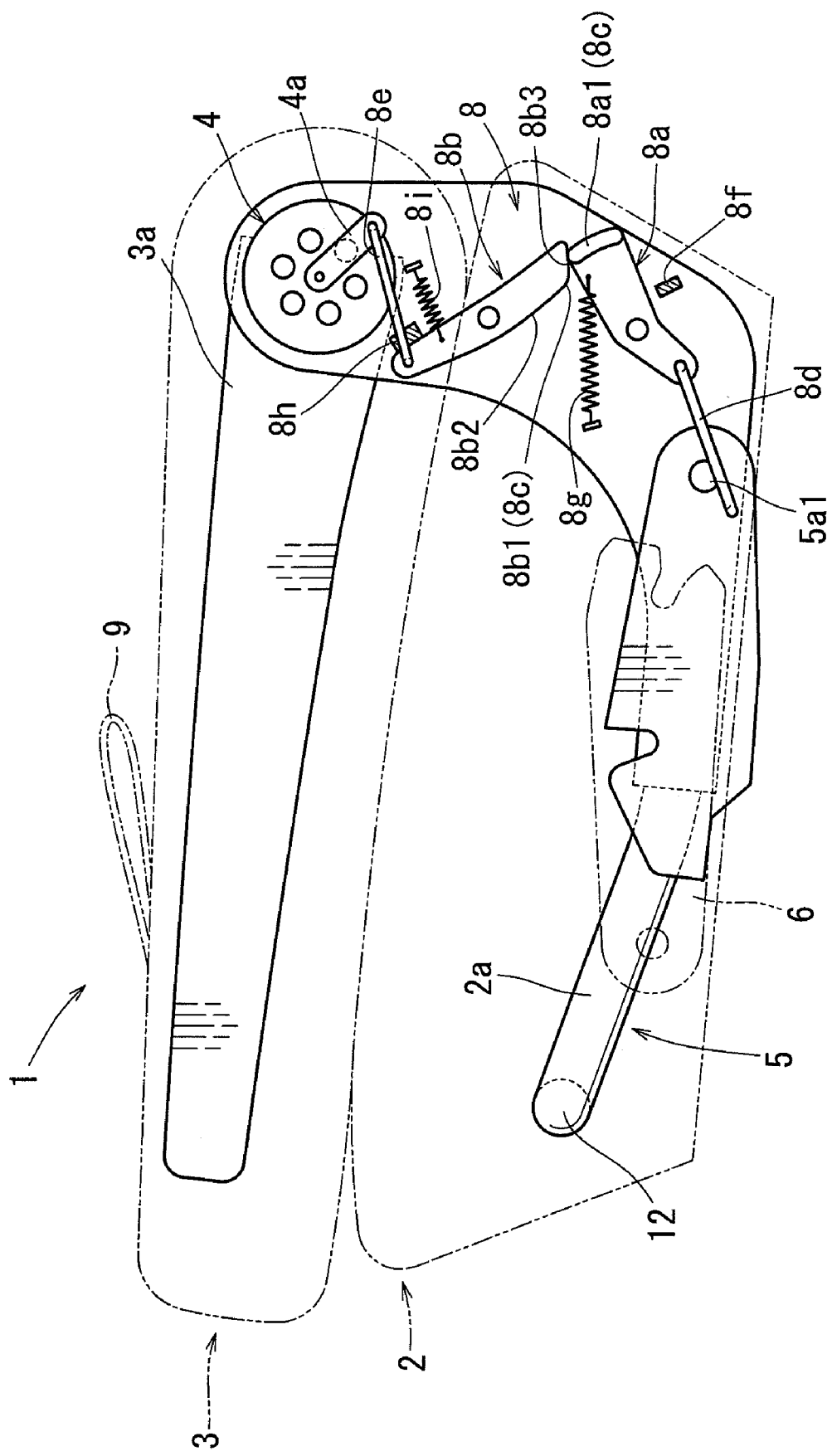
FIG. 4 is a side view of a part of the vehicular seat in the storage mode.

When the seat cushion 2 is moved to an upper side of the storage recess portion 13, an angle of pulling the operating band 9 is changed relative to the seat back 3. Thus the seat back 3 is inclined to a skewed front side by the operating band 9 (refer to FIG. 1). Further, the seat cushion 2 is moved to the storage recess portion 13 by a gravitational force while the seat back 3 is falling onto the seat cushion 2 by a gravitational force. Further, the angle of the seat back 3 reaches a free zone by exceeding an adjusting zone capable of adjusting the angle of the reclining apparatus 4. Thereafter, as shown in FIG. 4, the contact portion 8b1 is separated from the circular arc portion 8a1 and the sub cooperatively moving member 8b returns to an initial position by the urge member 8i.

In a case in which the reclining apparatus 4 is disposed in the free zone when the sub cooperatively moving member 8b returns to the initial position, the seat back 3 is moved onto the seat cushion 2 until the free zone is finished and the reclining apparatus 4 is brought into the lock state by finishing the free zone. In a case in which the reclining apparatus 4 is not disposed in the free zone when the sub cooperatively moving member 8b returns to the initial position, the reclining apparatus 4 is brought into the lock state. In this way, the seat back 3 is locked in a state folded onto the seat cushion 2.

Further, the connecting member 5 is connected to the leg 6 by a cooperatively moving portion of a cable or the like, not illustrated. Therefore, when the connecting member 5 is moved to the rear side, the leg 6 is moved to a side of the seat cushion 2 by the cooperatively moving portion (refer to FIG. 1). Further, when the seat cushion 2 is in the storage position, the leg 6 is aligned to a lower face of the seat cushion 2.

When the seat 1 moves from the storage mode to the use mode, the connecting member 5 is inclined in an upward direction. In this position, as shown in FIG. 4, the main cooperatively moving member 8a is moved in the counter-clockwise direction by force of the urge member 8g. Further, the circular arc portion 8a1 abuts the second force receiving portion 8b3, the sub cooperatively moving member 8b is moved in the counterclockwise direction, and the reclining apparatus 4 is released from the lock state.

Further, as shown in FIG. 3, the contact portion 8b1 reaches the circular arc portion 8a1, and the contact portion 8b1 slides along the circular arc portion 8a1. During the time, the reclining apparatus 4 is maintained in the lock release state, the seat back 3 is positioned upward relative to the seat cushion 2 and is set to a desired angle. Further, as shown in FIG. 2, the contact portion 8b1 is separated from the circular arc portion 8a1, the sub cooperatively moving member 8b returns to the initial position by the urge member 8i, and the reclining apparatus 4 returns to the lock state from the lock release state. Thereby, the seat back 3 is locked by a desired angle (position of use) relative to the seat cushion 2.

As described above, the seat 1 is provided with the connecting member (first member) 5 and the cooperatively moving apparatus 8. The connecting member 5 is moved while changing the mode. The cooperatively moving apparatus 8 may release the reclining apparatus (lock apparatus) 4 from being locked in cooperation with the movement of the connecting member 5 as shown in FIG. 3. The cooperatively moving apparatus 8 includes the main cooperatively moving member 8a and the sub cooperatively moving member 8b. The hold mechanism 8c is provided between the main cooperatively moving member 8a and the sub cooperatively moving member 8b. The hold mechanism 8c holds the reclining apparatus 4 in the lock release state by holding the amount of moving the sub cooperatively moving member 8b by the predetermined amount in the midst of operating the main cooperatively moving member 8a.

Therefore, the connecting member 5 is moved, the reclining apparatus 4 is released from being locked by the cooperatively moving apparatus 8, the lock release state is maintained by the hold mechanism 8c during the predetermined time period, and the seat back 3 can be adjusted to one of the plurality of set states during the time period. Further, thereafter, the reclining apparatus 4 is brought to the lock state, and the seat back 3 is locked to the desired set state. Therefore, the seat back 3 can easily be adjusted to the desired set state.

Further, the hold mechanism 8c includes the circular arc portion 8a1 and the contact portion 8b1 as shown in FIG. 3. The circular arc portion 8a1 is provided at the main cooperatively moving member 8a and has the circular arc face 8a4. The contact portion 8b1 is provided at the sub cooperatively moving member 8b. Therefore, the amount of the sub cooperatively moving member 8b moved by the main cooperatively moving member 8a is maintained by the predetermined amount by operation of the circular arc portion 8a1 and the contact portion 8b1. Further, the maintaining state can easily be adjusted by a length of the circular arc of the circular arc face 8a4 of the circular arc portion 8a1.

Further, as shown in FIGS. 2 and 4, the first force receiving portion 8b2 is provided at a position contiguous to one side of the contact portion 8b1. The second force receiving portion 8b3 is provided at a position contiguous to other side of the contact portion 8b1. Therefore, when the main cooperatively moving member 8a is inclined in one direction, the first force receiving portion 8b2 moves the reclining apparatus 4 from the lock release state from the lock state. When the main cooperatively moving member 8a is inclined in other direction, the second force receiving portion 8b3 moves the reclining apparatus 4 from the lock release state from the lock state. Therefore, the reclining apparatus 4 may be changed to the lock release state from the lock state in either direction of the movement the main cooperatively moving member 8a. Further, the contact portion 8b1 can maintain the reclining apparatus 4 in the lock release state.

As shown in FIG. 3, the seat 1 includes the connecting member 5 pivotably connecting the seat cushion 2 and the vehicular main body. When the seat cushion 2 is moved from the use position to the storage position by moving the connecting member 5, the cooperatively moving apparatus 8 releases the reclining apparatus 4 from the lock state, the hold mechanism 8c maintains the reclining apparatus 4 in the lock release state, the seat back 3 is adjusted to the desired angle relative to the seat cushion 2, and the reclining apparatus 4 is brought into a lock state at the storage position. Therefore, the reclining apparatus 4 can be maintained in the lock release state in the midst of moving of the seat cushion 2 from the use position to the storage position. Therefore, the angle of the seat back 3 can easily be adjusted relative to the seat cushion 2.

While the invention has been described with reference to specific configurations, it will be apparent to those skilled in the art that many alternatives, modifications and variations may be made without departing from the scope of the present invention. Accordingly, the present invention is intended to embrace all such alternatives, modifications and variations that may fall within the spirit and scope of the appended claims. For example, the present invention should not be limited to the representative configurations, but may be modified as described below.

Figure 6:
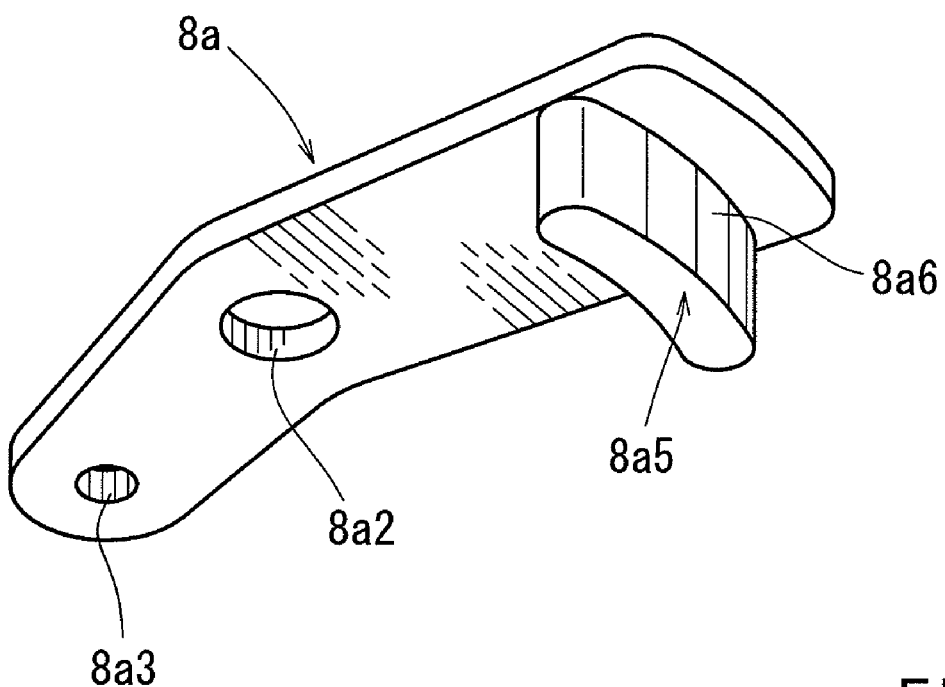
FIG. 6 is a perspective view of a main cooperatively moving member of another configuration.

(1) In FIG. 5, the sub cooperatively moving member 8b includes the circular arc portion 8a1 erected at the end edge. However, it can be configured as shown in FIG. 6, a circular arc portion 8a5 erected from one side face is provided. And the circular arc portion 8a5 includes a circular arc face 8a6 formed substantially in a circular arc shape and centered on the attaching portion (inclination center) 8a2.

(2) In FIG. 1, the seat 1 includes the connecting member 5 as the first member moved relative to the seat main body (frame 2a) when the position of the seat 1 is changed. The seat 1 further includes the reclining apparatus 4 as the lock apparatus released from being locked by the cooperatively moving apparatus 8. However, it can be configured in a way that a seat includes a seat back, a seat cushion, a leg or the like, moved relative to a seat main body or a vehicular floor, as a member moved when a position or a mode of the seat is changed. Further the seat includes a lock apparatus of locking the seat back and a vehicle body to be able to adjust a position thereof, a lock apparatus of locking the seat cushion of the vehicular body to be able to adjust a position thereof or the like, as a lock apparatus released from being locked by a cooperatively moving apparatus.

(3) In FIG. 3, the hold mechanism 8c includes the circular arc portion 8a1 provided on a side of the main cooperatively moving member 8a, and the contact portion 8b1 provided on a side of the sub cooperatively moving member 8b. However, it can be configured in a way that a hold mechanism includes the circular arc portion provided on the side of the sub cooperatively moving member, and the contact portion provided on the side of the main cooperatively moving member.

(4) In FIG. 1, the seat back 3 is positioned onto the seat cushion in the storage state. However, it can be configured in a way that the seat back is moved substantially horizontally to a position contiguous to the seat cushion in the storage state.

(5) In FIGS. 1 and 3, the seat back 3 is moved on the seat cushion 2 by the gravitational force. However, it can be configured in a way that the seat has an urge member to move the seat back to the front side. And the seat back can move onto the seat cushion by a force of the urging member. Further, in that case, the seat back falls forcibly, and therefore, a time period of holding the sub cooperatively moving member can be shortened. As a result, the circular arc portion 8a1 can be reduced.

This invention claims:

1. A vehicular seat comprising:

a first member;

a cooperatively moving apparatus configured to release a lock apparatus from being locked in cooperation with a movement of the first member;

a second member configured to be adjusted when the lock apparatus is released, wherein the cooperatively moving apparatus includes a main cooperatively moving member connected to the first member and capable of cooperative movement with the first member, and a sub cooperatively moving member connected to the lock apparatus and capable of being moved by receiving a force from the main cooperatively moving member; and a hold mechanism provided between the main cooperatively moving member and the sub cooperatively moving member, wherein the hold mechanism is capable of holding the lock apparatus in a lock release state by holding a portion of the sub cooperatively moving member by a predetermined amount while operating the main cooperatively moving member, wherein two members of the main cooperatively moving member and the sub cooperatively moving member are attached to a seat main body, the hold mechanism includes a circular arc portion provided at one of the two members and a contact portion provided at the other of the two members, the circular arc portion has a circular arc face formed substantially in a circular arc shape centering on a fulcrum of the one member, and the contact portion may slide along the circular arc face of the circular arc portion, and wherein when the lock apparatus is maintained in the lock release state, the second member is set to one of a plurality of set states, and the lock apparatus is able to be brought into a lock state before and after operating the hold mechanism.

2. The vehicular seat as in claim 1, wherein:

a first force receiving portion is provided at a position contiguous to one side of the contact portion, a second force receiving portion is provided at a position contiguous to other side of the contact portion, when the main cooperatively moving member is inclined in one direction, the first force receiving portion contacts the circular arc portion and guides the contact portion to the circular arc portion, and when the main cooperatively moving member is inclined in other direction, the second force receiving portion contacts the circular arc portion and guides the contact portion to the circular arc portion.

3. A vehicular seat comprising:

a seat back a seat cushion;

a reclining apparatus connecting the seat cushion and the seat back adjustably by a plurality of relative angles;

a connecting member pivotably connecting the seat cushion and a vehicular main body;

a cooperatively moving apparatus configured to release the reclining apparatus from being locked in cooperation with a movement of the connecting member, wherein the seat back is configured to be adjusted when the reclining apparatus is released, and wherein the cooperatively moving apparatus includes a main cooperatively moving member connected to the connecting member and capable of cooperative movement with the connecting member, and a sub cooperatively moving member connected to the reclining apparatus and capable of being moved by receiving a force from the main cooperatively moving member; and a hold mechanism provided between the main cooperatively moving member and the sub cooperatively moving member, wherein the hold mechanism is capable of holding the reclining apparatus in a lock release state by holding a portion of the sub cooperatively moving member by a predetermined amount while operating the main cooperatively moving member;

when the reclining apparatus is maintained in the lock release state, the seat back is set to one of a plurality of set states, and the reclining apparatus is able to be brought into a lock state before and after operating the hold mechanism, and when the seat cushion is moved from a use position to a storage position by inclining the connecting member, the reclining apparatus is released from the lock state by the cooperatively moving apparatus, the lock release state is held by the hold mechanism, the seat back is adjusted to a desired angle relative to the seat cushion, and the reclining apparatus is brought into the lock state when the seat cushion is moved to the storage position.

* * * * *